United States Patent [19]

Shin

[11] Patent Number: 5,766,493
[45] Date of Patent: Jun. 16, 1998

[54] METHOD OF FABRICATING A LIQUID CRYSTAL DISPLAY SUBSTRATE

[75] Inventor: Woo Sup Shin, Kyongki-do, Rep. of Korea

[73] Assignee: LG Electronics Inc., Seoul, Rep. of Korea

[21] Appl. No.: 549,442

[22] Filed: Oct. 27, 1995

[30] Foreign Application Priority Data

Jul. 6, 1995 [KR] Rep. of Korea ............... 95-19712

[51] Int. Cl.$^6$ .......................................... G02F 1/13
[52] U.S. Cl. ............................................ 216/23; 216/36
[58] Field of Search ............................ 156/101, 145, 156/154; 216/23, 36, 52, 88; 430/20, 321; 349/158

[56] References Cited

U.S. PATENT DOCUMENTS

| | | | |
|---|---|---|---|
| 5,042,918 | 8/1991 | Suzuki | 359/59 |
| 5,159,787 | 11/1992 | Suenaga et al. | 216/89 |
| 5,429,711 | 7/1995 | Watanabe et al. | 216/52 |
| 5,434,433 | 7/1995 | Takasu et al. | 257/59 |
| 5,505,804 | 4/1996 | Mizuguchi et al. | 156/154 |

FOREIGN PATENT DOCUMENTS

| | | |
|---|---|---|
| 4-116619 | 4/1992 | Japan. |
| 5-249422 | 9/1993 | Japan. |
| 7-168172 | 7/1995 | Japan. |

*Primary Examiner*—John A. McPherson
*Attorney, Agent, or Firm*—Morgan, Lewis & Bockius LLP

[57] ABSTRACT

A method of fabricating a substrate includes the steps of providing a first substrate having a first thickness, providing a second substrate having a second thickness, providing an inner layer between the first and second substrates, assembling the first substrate, the second substrate, and the inner layer using an adhesive, and reducing the thickness of at least one of the first and second substrates.

4 Claims, 3 Drawing Sheets

METHOD OF FABRICATING A LIQUID CRYSTAL DISPLAY SUBSTRATE

BACKGROUND OF THE INVENTION

1. Field Of The Invention

The present invention relates to a method of fabricating a substrate, and more particularly, to a method of fabricating a substrate for a liquid crystal display.

2. Discussion of the Related Art

Generally, in a liquid crystal display, upper and lower substrates are joined. A substrate having a pixel electrode and switching device in a matrix, and a substrate having a color filter arranged to realize colors and a common electrode are attached to each other. Liquid crystal is injected between the two substrates, which are in turn sealed. When an electric field is applied externally, the liquid crystal moves according to the electric field so that an image is displayed by light passing through the substrates.

As shown in FIG. 1, a conventional liquid crystal display includes liquid crystal 5 having light transmissivity that varies with electric field, a first transparent substrate 3 (lower substrate) on which an electric wire is formed to apply an electric field to a selected portion, and a second transparent substrate 4 (color filter substrate). The liquid crystal 5 is injected between substrates 3 and 4. Then, they are sealed by a sealant 6. Polarizing plates 2-1 and 2-2 are attached to substrates 3 and 4. A back light 1 for producing light is fastened to the bottom of the lower substrate.

In the first transparent substrate, a scanning line, a data line, a pixel electrode, and switching means for controlling an electric field to the pixel electrode are arranged in a matrix. To the second transparent substrate, the common electrode and color filter are attached. Leads and pads for receiving external signals are formed on the substrates.

A method of fabricating such a liquid crystal display will be discussed below.

On a transparent substrate, such as glass, several hundred thousand to several million unit pixel electrodes are disposed along with control devices for controlling data to be applied to those pixel electrodes, and data lines and scanning lines for externally applying a video signal are formed. This constitutes first transparent substrate 3.

On another transparent substrate, a color filter and a common electrode for forming colors by passing light controlled only by the pixel electrodes are disposed to form second transparent substrate 4. After the lower and upper substrates are assembled, a sealant is spread thereon to seal them. The two substrates are arranged to be joined. The liquid crystal is injected therebetween, and finally the liquid crystal injection hole is closed so that the liquid crystal is not discharged externally.

After the liquid crystal sealing process, polarizing plates 2-1 and 2-2 are attached to the substrates. In order to externally apply a signal, a drive IC is connected to the leads. A back light, that is, light emitting means, and attaching means assembled under the lower substrate to complete the liquid crystal display.

In fabricating the upper and lower substrates according to the conventional method, rinsing/deposition or etching equipment is used through several tens of processes. Here, physical forces may be applied to the transparent substrates during the processes. Further, the substrates undergo heating and cooling processes which can damage the substrates, if fragile.

In the conventional technique, transparent glass is used for the substrates in manufacturing the liquid crystal display. Commercially available glass is usually 1.1 mm-thick. However, in order to reduce the weight of the liquid crystal display, a substrate of 0.7 mm has been considered to be used. In the conventional technique described above, if the thickness of the substrate is determined at the initial stage, the same thickness is maintained to the final product.

Since conventionally used glass is comparatively thick, it is protected against physical or thermal impacts during the procedure. However, if a thin substrate is used at the initial stage, the yield decreases due to damage or deformation. In addition, for manufacturing the lower substrate and liquid crystal filling processes, the process of heating or cooling between 200°–300° C. occurs over ten times and a high-speed rotation rinsing or coating process is repeated. For this reason, the thickness of glass cannot be reduced. There are limitations in reducing the weight of a liquid crystal display. In order to solve these problems, the equipment must be improved or additional functions must be provided, thereby increasing the cost of the final product.

SUMMARY OF THE INVENTION

The present invention has been made in view of the above circumstances and has as an object to overcome the problems and disadvantages of the prior art.

Another object of the present invention is to provide a method of fabricating a substrate that is light and thin.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a method of fabricating a substrate includes the steps of providing a first substrate having a first thickness; providing a second substrate having a second thickness; providing an inner layer between the first and second substrates; assembling the first substrate, the second substrate, and the inner layer using an adhesive; and reducing the thickness of at least one of the first and second substrates.

In another aspect of the present invention, a method of fabricating a substrate for a liquid crystal display includes steps of providing a first transparent substrate having a first thickness; providing a second transparent substrate having a second thickness; assembling the first and second transparent substrates to provide a space between the first and second transparent substrates; reducing at least one of the first and second thickness; injecting a liquid crystal into the space between the first and second transparent substrates; and sealing the space between the first and second transparent substrates.

In a further aspect of the present invention, a method of fabricating a liquid crystal display includes the steps of providing a first transparent substrate having a first thickness; providing a second transparent substrate having a second thickness; assembling the first and second transparent substrates to provide a space between the first and second transparent substrates; reducing at least one of the first and second thicknesses; injecting a liquid crystal into the space between the first and second transparent substrates; and sealing the space between the first and second transparent substrates.

BRIEF DESCRIPTION OF THE DRAWINGS

The accompanying drawings, which are incorporated in and constitute a part of this specification, illustrate several

Figure 1:
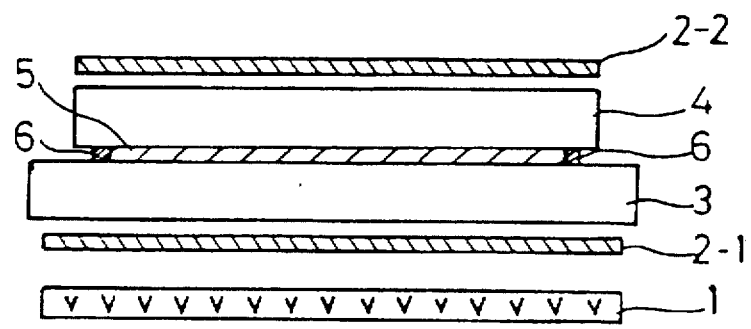

3 embodiments of the invention and, together with the description, serve to explain the principles of the invention.

Figure 2A:
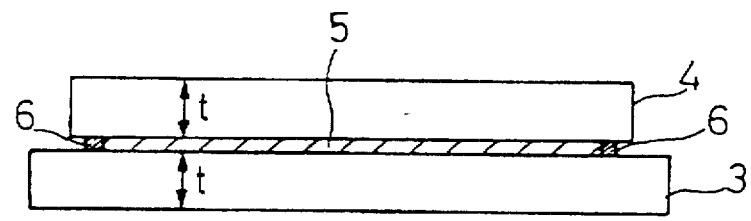
Figure 2B:
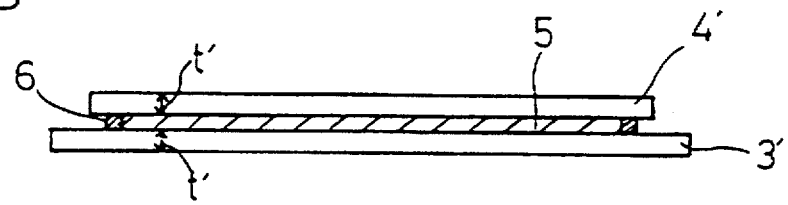

In the drawings:

FIG. 1 is a schematic cross-sectional view of a conventional substrate;

FIGS. 2A and 2B are schematic cross-sectional views of a first embodiment of a substrate of the present invention; and FIGS. 3A–3G are schematic cross-sectional views of a second embodiment of a substrate of the present invention.

DETAILED DESCRIPTION OF THE PREFERRED EMBODIMENTS

Reference will now be made in detail to the preferred embodiments of the invention, examples of which are illustrated in the accompanying drawings.

As shown in FIG. 2A, in a first embodiment, upper substrate 4 (the second transparent substrate) and lower substrate 3 (the first transparent substrate), of thicknesses t, are joined. An interlevel material 5 is injected therebetween. The joined substrates are sealed by sealant 6. The two substrates 3 and 4 are completely closed by sealant 6.

The overall thickness of the upper and lower substrates is the sum of the thickness of the transparent substrates and the thickness of interlevel material 5. The thickness between the upper and lower substrates is the thickness of the interlevel material, which is very small (usually 5–6mm). Therefore, the actual thickness of the substrates when joined is about 2t.

In this condition, when the outer surface of the joined upper and lower substrates is etched or polished using a polishing agent so as to reduce their thickness, the thickness can be controlled as desired. As shown in FIG. 2B, the thickness of upper and lower substrates 4' and 3' becomes 2t' (after etching or polishing). In addition, upper and lower substrates different thicknesses may be used initially. The upper and lower substrates 3 and 4 may be made of a transparent insulator, a metal plate, or a semiconductor plate. The upper and lower substrates may be made of the same or different material to fabricate lightweight, thin substrates.

The following three methods may be used to polish the upper and lower substrates:

(1) mechanical method: the joined upper and lower substrates are polished using sandpaper or a polishing device employing a polishing agent, while being sprayed with a coolant;

(2) chemical method: the substrates are etched using a solution, such as a strong acid, for dissolving them (this does not involve substrate damage because there is no physical force); and (3) using a combination of both methods (1) and (2).

Figure 3A:
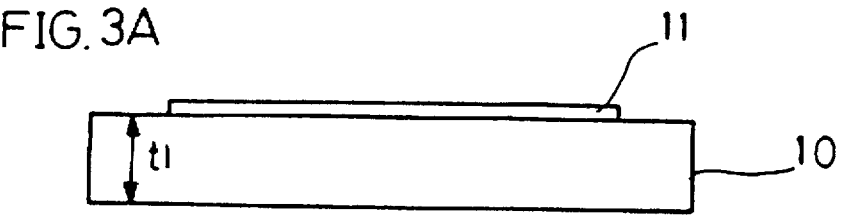

As shown in FIG. 3A, substrate 10 of thickness t1 is used to form element 11 of a thin-film transistor (TFT), i.e., the switching means, pixel electrode, scanning line and data line in the same method as the conventional manufacturing process. This forms first substrate 10 which is the lower substrate.

Figure 3B:
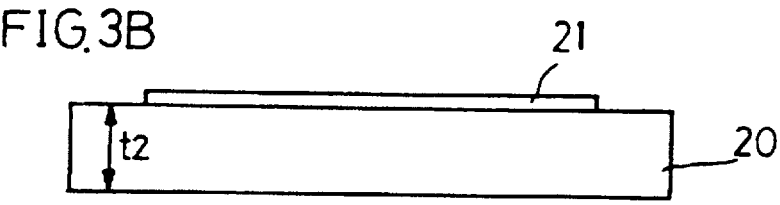

In FIG. 3B, substrate 20 of thickness t2 is used to fabricate color filter 21 in the same method as the conventional process to make the second substrate 20, which is the upper substrate. Here, thicknesses t1 and t2 may be different or the same.

Figure 3C:
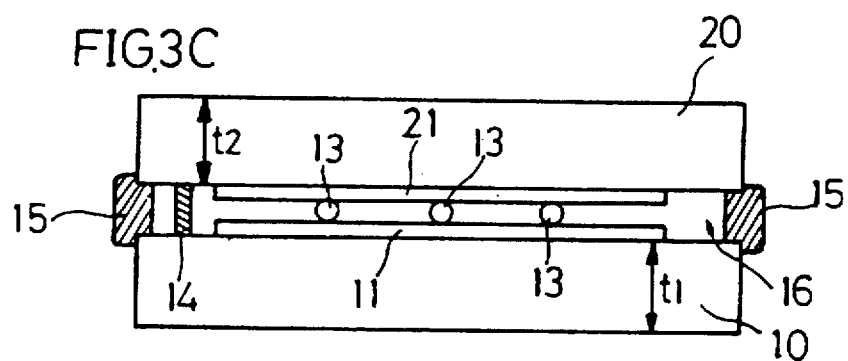

As shown in FIG. 3C, after a process of coating an orientation layer for orienting liquid crystal onto the upper and lower substrates, a spacer 13 is sprayed in order to maintain a constant distance between the upper and lower substrates. A sealant 14 is provided on the substrates except at liquid crystal injection hole 16 to prevent the liquid crystal from discharging. Thereafter, the upper and lower substrates are joined.

Figure 3D:
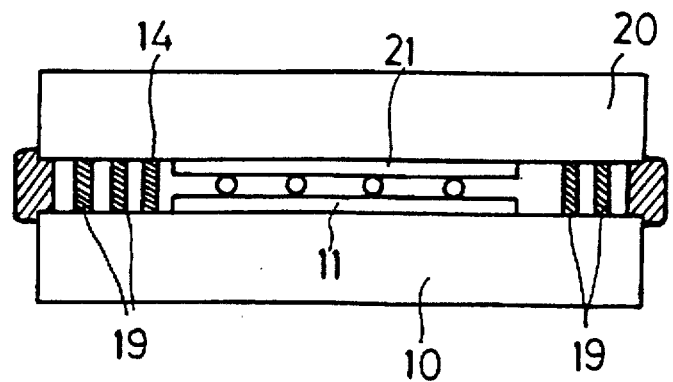

In order to completely prevent foreign materials or strong acid from entering between the two substrates, auxiliary sealant 19 may be used outside and in addition to sealant 14, as shown in FIG. 3D. Here, the material used for auxiliary sealant 19 may be the same as or different from the material used for sealant 14 and can be processed at the same time.

Figure 3E:
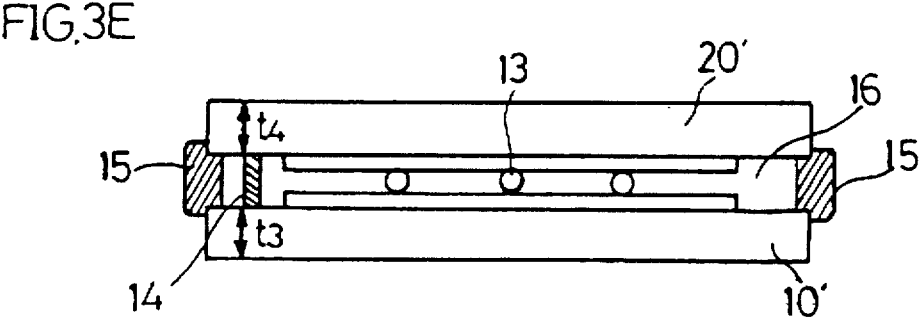

During the next process of etching the substrates to prevent foreign materials or strong acid from entering between the first and second substrates, i.e., to prevent foreign materials or strong acid from entering TFT device 11 and color filter 21, acid-resistant sealant 15 is used. After these processes, when the substrates are put into a strong acid, for example, a solution for etching glass substrate at a high speed, and etched for a predetermined time, the thickness of the upper and lower substrates is reduced from t2 to t4 and from t1 to t3, as shown in FIG. 3E. Thus, thinner and lighter upper and lower substrates 20' and 10' are obtained. Here, the thickness of the substrates is controlled by the etching time. In order to reduce the thickness of the substrates, sandpaper or a polishing device using a polishing agent may be used physically, instead of the etching.

Figure 3F:
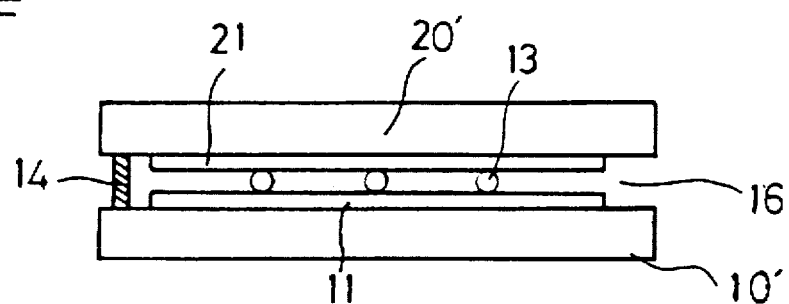
Figure 3G:
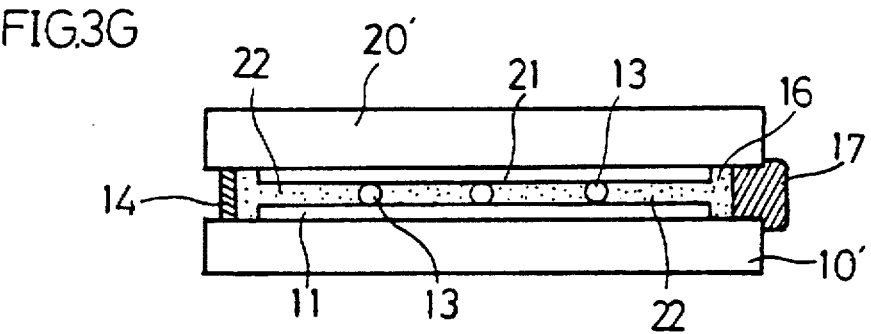

After the etching is finished, minute scratches are polished, and unnecessary substrate portions are removed using a substrate cutter, as shown in FIG. 3F. Here, acid-resistant sealant 15 and auxiliary sealant 19 are also removed. As shown in FIG. 3G, after the substrates are cut, liquid crystal 22 is injected through liquid crystal injection hole 16. The injection hole 16 is sealed by sealant 17 to prevent the liquid crystal from discharging, thus completing the process.

According to another method, similar to the method of FIGS. 3A–3G, the first and second substrates are joined and then liquid crystal is injected therebetween. The first and second substrates are sealed by acid-resistant sealant 15. Subsequently, the first and second substrates are polished using the polishing device or chemical solution. The succeeding processes are the same as the conventional processes.

Although, as described above, both the first and second substrates are cut, only one of the first and second substrates may be cut, and still obtain the advantageous effect of the present invention. For instance, if the first substrate is glass and the second substrate is plastic, only the first or second substrate may be cut. Further, if the first substrate is a silicon wafer and the second substrate is plastic, the first or second substrate only may be polished.

Accordingly, in the present invention, the first and second substrates are sealed by an acid-resistant sealant, and their outer surfaces are polished. Then, the portion sealed by an acid-resistant sealant is cut. Prior to the joining of the first and second substrates, a sealant is used for sealing the structure. In this case, the structure may be dual and then the outer structure may be cut.

As described above, in the present invention, during a process of making pixels and a color filter during which the substrates receive severe physical or thermal impacts, substrates of a stable thickness are used. After the two substrates are joined and before or after liquid crystal is injected, that is, after the process of receiving physical or thermal impacts, the substrates are polished using a polishing device employing a polishing agent, or by wet etching. Through this process, the thickness of the substrates is reduced, decreasing the number of poor quality products and obtaining light and thin substrates.

According to the method above, the present invention has the following advantages.

(a) There is no need to use an unstable thin substrate from the initial process, while still obtaining a stabilized process and using inexpensive substrates. This also reduces cost for equipment improvement and addition of functions.

(b) This method is stable, thus obtaining stable yield and allowing a competitive edge.

(c) As the most effective advantage, the substrates are polished after the process of receiving physical or thermal impacts so as to control the thickness to obtain thin and light products, unlike a case in which, if a thin substrate is used at the initial stage, its thickness cannot be reduced below a predetermined thickness (0.7 mm) due to possible damage thereby limiting the use of this procedure.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of fabricating a substrate for a liquid crystal display, the method comprising the steps of:

providing a first transparent substrate having a first transparent thickness, the first transparent substrate being made of a glass material, and the first transparent substrate being used to form transistor elements;

providing a second transparent substrate having a second transparent thickness, the second transparent substrate being made of a glass material, and the second transparent substrate being used to form a color filter;

providing an inner layer having liquid crystals between the first and second transparent substrates;

assembling the first transparent substrate, the second transparent substrate, and the inner layer using an adhesive, the assembling including the step sealing the inner space within the first and second transparent substrates;

temporarily sealing a space between the first and second transparent substrates using a temporary sealant;

substantially uniformly reducing the transparent thickness of both the first and second transparent substrates by using both chemical and mechanical etching after the assembling step, the reducing step using chemical etching including the step of dissolving both of the first and second transparent substrates using an acid solution, and the reducing step using mechanical etching including the step of scrap in both of the first and second transparent substrates; and removing the temporary sealant between the first and second transparent substrates after the reducing step.

2. The method of fabricating a substance for a liquid crystal display according to claim 1, further comprising the step of attaching first and second polarizing plates between the first and second transparent substrates.

3. A method of fabricating a substance for a liquid crystal display, the method comprising the steps of;

providing a first transparent substrate having a first transparent thickness, the first transparent substrate being made of a glass material, and the first transparent substrate being used to form transistor elements;

providing a second transparent substrate having a second transparent thickness, the second transparent substrate being made of a glass material, and the second transparent substrate being used to form a color filter;

providing an inner space for receiving liquid crystals between the first and second transparent substrates;

assembling the first transparent substrate, the second transparent substrate, and the inner space using an adhesive, the assembling step including the step of sealing the inner space within the first and second transparent substrates;

temporarily sealing a space between the first and second transparent substrates using a temporary sealant;

substantially uniformly reducing the transparent thickness of both the first and second transparent substrates by using both chemical and mechanical etching after the assembling step, the reducing step using chemical etching including the step of dissolving both of the first and second transparent substrates using an acid solution, and the reducing step using mechanical etching including the step of scraping both of the first and second transparent substrates; and removing the temporary sealant between the first and second transparent substrates after the reducing step;

injecting a liquid crystal into the inner space between the first and second transparent substrates; and sealing the space between the first and second transparent substrates.

4. The method of fabricating a substrate for a liquid crystal display according to claim 3, further comprising the step of attaching first and second polarizing plates between the first and second transparent substrates.

* * * * *